US011176471B1

(12) United States Patent
DeCaprio et al.

(10) Patent No.: US 11,176,471 B1
(45) Date of Patent: Nov. 16, 2021

(54) EXPLAINABLE MACHINE LEARNING MODELS

(71) Applicant: ClosedLoop.ai Inc., Austin, TX (US)

(72) Inventors: David Matthew DeCaprio, Austin, TX (US); Andrew Everett Eye, Austin, TX (US); Carol Jeanne McCall, Austin, TX (US); Joshua Taylor Gish, Austin, TX (US); Thadeus Nathaniel Burgess, Austin, TX (US)

(73) Assignee: ClosedLoop.ai Inc., Austin, TX (US)

( * ) Notice: Subject to any disclaimer, the term of this patent is extended or adjusted under 35 U.S.C. 154(b) by 0 days.

(21) Appl. No.: 17/325,154

(22) Filed: May 19, 2021

(51) Int. Cl.
*G06N 5/04* (2006.01)
*G06K 9/62* (2006.01)
*G06N 20/00* (2019.01)

(52) U.S. Cl.
CPC ........... *G06N 5/045* (2013.01); *G06K 9/6231* (2013.01); *G06N 20/00* (2019.01)

(58) Field of Classification Search
CPC ....... G06N 5/045; G06N 20/00; G06K 9/6231
See application file for complete search history.

(56) References Cited

U.S. PATENT DOCUMENTS

2020/0279182 A1\* 9/2020 So ........................ G06F 40/205

FOREIGN PATENT DOCUMENTS

WO    WO 2020/191057    9/2020

OTHER PUBLICATIONS

Ribeiro, M.T., Singh, S. and Guestrin, C., Aug. 2016, "Why should i trust you?" Explaining the predictions of any classifier. In Proceedings of the 22nd ACM SIGKDD international conference on knowledge discovery and data mining (pp. 1135-1144).\*
Liu, G., Lu, D. and Lu, J., 2021. Pharm-AutoML: An open-source, end-to-end automated machine learning package for clinical outcome prediction. CPT: pharmacometrics & systems pharmacology, 10(5), pp. 478-488.\*
Choi, E., Bahadori, M.T., Kulas, J.A., Schuetz, A., Stewart, W.F. and Sun, J., 2016. Retain: An interpretable predictive model for healthcare using reverse time attention mechanism. arXiv preprint arXiv: 1608.05745.\*

(Continued)

*Primary Examiner* — Zhitong Chen
(74) *Attorney, Agent, or Firm* — Fish & Richardson P.C.

(57) ABSTRACT

Methods, systems, and apparatus, including computer programs encoded on a computer storage medium, for explainable machine learning. In one aspect, a method comprises: obtaining a collection of data elements characterizing an entity; generating a plurality of features that collectively define a feature representation of the entity from the collection of data elements characterizing the entity; processing the feature representation of the entity using a machine learning model to generate a prediction for the entity; generating evidence data characterizing data elements from the collection of data elements that explain the prediction generated by the machine learning model for the entity; and providing an output comprising the prediction for the entity and the evidence data characterizing data elements from the collection of data elements that explain the prediction for the entity.

20 Claims, 5 Drawing Sheets

(56) References Cited

OTHER PUBLICATIONS

Choi et al., "RETAIN: An Interpretable Predictive Model for Healthcare using Reverse Time Attention Mechanism," arXiv, Feb. 26, 2017, arXiv:1608.05745v4, 13 pages.
ClosedLoop.ai, "Healthcare's Data Science Platform," upon information and belief, available no later than May 19, 2021, 2 pages.
DataRobot.com [online], "Explainable AI," available on or before May 24, 2020 via Internet Archive: Wayback Machine URL<https://web.archive.org/web/20200524000711/https://www.datarobot.com/wiki/explainable-ai/>, retrieved on Jun. 3, 2021, retrieved from URL<https://www.datarobot.com/wiki/explainable-ai/>, 4 pages.
Liu et al., "Pharm-AutoML: An open-source, end-to-end automated machine learning package for clinical outcome prediction," CPT Pharmacometrics Syst. Pharmacology, Apr. 1, 2021, 10(5):478-488.
Lundberg et al., "A Unified Approach to Interpreting Model Predictions," Proceedings of the 31st Conference on Neural Information Processing Systems (NIPS 2017), Long Beach, CA, USA, Dec. 4-9, 2017, 10 pages.
Ribeiro et al., ""Why Should I Trust You?" Explaining the Predictions of Any Classifier," arXiv, Feb. 16, 2016, arXiv:1602.04938v1, 15 pages.

\* cited by examiner

EXPLAINABLE MACHINE LEARNING MODELS

BACKGROUND

This specification relates to generating explainability data that explains predictions generated by a machine learning model.

Machine learning models receive an input and generate an output, e.g., a predicted output, based on the received input. Some machine learning models are parametric models and generate the output based on the received input and on values of the parameters of the model.

SUMMARY

This specification describes an explainable prediction system implemented as computer programs on one or more computers in one or more locations.

According to a first aspect, there is provided a method performed by one or more data processing apparatus, the method comprising: obtaining a collection of data elements characterizing an entity; generating a plurality of features that collectively define a feature representation of the entity from the collection of data elements characterizing the entity; processing the feature representation of the entity using a machine learning model to generate a prediction for the entity; generating evidence data characterizing data elements from the collection of data elements that explain the prediction generated by the machine learning model for the entity; and providing an output comprising the prediction for the entity and the evidence data characterizing data elements from the collection of data elements that explain the prediction for the entity.

In some implementations, generating evidence data characterizing data elements from the collection of data elements that explain the prediction generated by the machine learning model for the entity comprises: identifying one or more of the features in the feature representation as being high-impact features; identifying, for each high-impact feature, a respective proper subset of the collection of data elements as being relevant to the high-impact feature; and generating respective evidence data for each high-impact feature that based on the proper subset of the collection of data elements that are relevant to the high-impact feature.

In some implementations, identifying one or more of the features in the feature representation as being high-impact features comprises: generating a respective explainability score for each feature in the feature representation that measures an impact of the feature on the prediction generated by the machine learning model for the entity; identifying one or more of the features having the highest explainability scores as being high-impact features.

In some implementations, identifying one or more of the features having the highest explainability scores as being high-impact features comprises: identifying each feature having an explainability score that satisfied a predefined threshold as being a high-impact feature.

In some implementations, the predefined threshold is determined to be a value that, when provided as an input to a classifier as an absolute value of an explainability score for a feature, results in the classifier generating an output that defines a specified predicted likelihood that each explainability score in a set of explainability scores for the feature have a same sign.

In some implementations, the method further comprises: normalizing the explainability scores for the features in the feature representation of the entity; and providing the normalized explainability scores for processing by a clustering operation.

In some implementations, only a proper subset of the features in the feature representation are identified as being high-impact features.

In some implementations, for each high-impact feature, identifying a respective proper subset of the collection of data elements as being relevant to the high-impact feature comprises: applying one or more respective filtering operations associated with the high-impact feature to the collection of data elements to select the proper subset of the collection of data elements that are relevant to the high-impact feature.

In some implementations, for each high-impact feature, generating respective evidence data for the high-impact feature comprises: applying one or more summarization operations to generate a summary of the proper subset of the collection of data elements that are relevant to the high-impact feature.

In some implementations, the method further comprises, prior to generating the respective evidence data for each high-impact feature: determining the filtering operations and the summarization operations to be used to generate the evidence data for the high-impact feature based on filtering operations and transformation operations applied to the collection of data elements to generate the high-impact feature.

In some implementations, for each high-impact feature, the proper subset of the collection of data elements that are relevant to the high-impact feature comprises data elements that were used to generate the high-impact feature.

In some implementations, generating each feature of the feature representation comprises: identifying a respective proper subset of the collection of data elements as being relevant to the feature; and generating the feature by applying one or more transformation operations to the proper subset of the collection of data elements that are relevant the feature.

In some implementations, identifying a respective proper subset of the collection of data elements as being relevant to the feature comprises: applying a filtering operation associated with the feature to the collection of data elements, wherein the filtering operation defines one or more selection criteria that, if satisfied by a data element, indicate that the data element is relevant to the feature.

In some implementations, the selection criteria of the filtering operation are based on one or more of: values of data elements, types of data elements, and time stamps associated with data elements.

In some implementations, generating the feature by applying one or more transformation operations to the proper subset of the collection of data elements that are relevant to the feature comprises: applying a counting operation to the proper subset of the collection of data elements that are relevant to the feature that outputs a value representing a number of data elements in the proper subset of the collection of data elements that are relevant to the feature; and determining a value of the feature based on the output of the counting operation.

In some implementations, generating the feature by applying one or more transformation operations to the proper subset of the collection of data elements that are relevant to the feature comprises: applying a model fitting operation to the collection of data elements that are relevant to the feature by determining values of one or more parameters of a specified model to fit the model to the proper subset of the collection of data elements that are relevant to the feature; and determining a value of the feature based on the values of one or more parameters of the specified model.

In some implementations, providing the output comprises presenting a representation of the prediction for the entity and the evidence data characterizing data elements from the collection of data elements that explain the prediction for the entity to a user for use in interpreting a rationale used by the machine learning model to generate the prediction for the entity.

In some implementations, the method further comprises: determining that the prediction for the entity exceeds a threshold; and generating the evidence data for the prediction in response to determining that the prediction for the entity exceeds the threshold.

According to another aspect, there is provided a system comprising: one or more computers; and one or more storage devices communicatively coupled to the one or more computers, wherein the one or more storage devices store instructions that, when executed by the one or more computers, cause the one or more computers to perform operations comprising: obtaining a collection of data elements characterizing an entity; generating a plurality of features that collectively define a feature representation of the entity from the collection of data elements characterizing the entity; processing the feature representation of the entity using a machine learning model to generate a prediction for the entity; generating evidence data characterizing data elements from the collection of data elements that explain the prediction generated by the machine learning model for the entity; and providing an output comprising the prediction for the entity and the evidence data characterizing data elements from the collection of data elements that explain the prediction for the entity.

According to another aspect, there are provided one or more non-transitory computer storage media storing instructions that when executed by one or more computers cause the one or more computers to perform operations comprising: obtaining a collection of data elements characterizing an entity; generating a plurality of features that collectively define a feature representation of the entity from the collection of data elements characterizing the entity; processing the feature representation of the entity using a machine learning model to generate a prediction for the entity; generating evidence data characterizing data elements from the collection of data elements that explain the prediction generated by the machine learning model for the entity; and providing an output comprising the prediction for the entity and the evidence data characterizing data elements from the collection of data elements that explain the prediction for the entity.

Particular embodiments of the subject matter described in this specification can be implemented so as to realize one or more of the following advantages.

The system described in this specification can generate a prediction for an entity by processing a collection of data elements characterizing the entity. More specifically, the system can repeatedly filter and aggregate the collection of data elements to generate a set of features characterizing the entity. The system can then provide the set of features characterizing the entity to a machine learning model that processes the set of features in accordance with a set of learned parameter values to generate a prediction for the entity.

Many machine learning models can operate as "black boxes," i.e., because the learned parameter values of the machine learning model reveal little interpretable insight into the rationale used by the machine learning model to generate predictions. Operating as a black box can limit the utility and applicability of machine learning models, particularly in settings where acting on the predictions generated by the machine learning model requires user trust and confidence in their validity. Therefore, in addition to generating a prediction for an entity, the system described in this specification can also generate explainability data that provides an interpretable rationale to explain why the machine learning model generated the prediction.

To generate explainability data for a prediction generated by the machine learning model, the system can generate an "explainability" score for each feature that measures an impact of the feature on the prediction generated by the machine learning model. The system can identify one or more of the features having the highest explainability scores as being "high-impact" features, e.g., that significantly impacted the prediction, and can generate respective "evidence" data for each high-impact feature.

The system can generate evidence data for a high-impact feature by filtering the collection of data elements to select data elements that are relevant to the high-impact feature, e.g., that were processed by the system to generate the high-impact feature. For example, for a "number of emergency room visits" feature that indicates the number of times a person has visited an emergency room in the last 12 months, the evidence data can include, e.g., a listing of the respective date and reason for each emergency room visit by the person in the last 12 months. The system can explain the prediction generated by the machine learning model using a combination of the high-impact features, the explainability scores for the high-impact features, and the underlying evidence data supporting the high-impact features. Including the evidence data in the explainability data can significantly increase the granularity and interpretative value of the explainability data as compared to, e.g., explaining a prediction based on only the high-impact features, as will be described in more detail below.

Rather than generating evidence data supporting every feature, the system can generate evidence data only for features that are identified as being high-impact features, i.e., that significantly impacted the prediction. The high-impact features represent a proper subset of the total number of features, and in some cases, can represent only a small fraction of the total number of features, e.g., less than 10%, less than 5%, or less than 1% of the total number of features. Generating evidence data for only high-impact features rather than for all features can increase the efficiency of the system and significantly reduce consumption of computational resources (e.g., memory and computing power) by the system.

The system can further reduce consumption of computational resources by adaptively determining whether to generate explainability data for a prediction generated by the machine learning model, and in some cases, refraining from generating explainability data. For example, the system can determine that explainability data should be generated for a prediction only if the value of the prediction exceeds a threshold, e.g., defined by the $90^{th}$ percentile (or any other appropriate percentile) of predictions previously generated by the machine learning model. The system can thus enable more efficient allocation of computational resources, e.g., by concentrating the computing resources required to generate explainability data on only certain predictions generated by the machine learning model.

The details of one or more embodiments of the subject matter of this specification are set forth in the accompanying

BRIEF DESCRIPTION OF THE DRAWINGS

Like reference numbers and designations in the various drawings indicate like elements.

DETAILED DESCRIPTION

Figure 1:
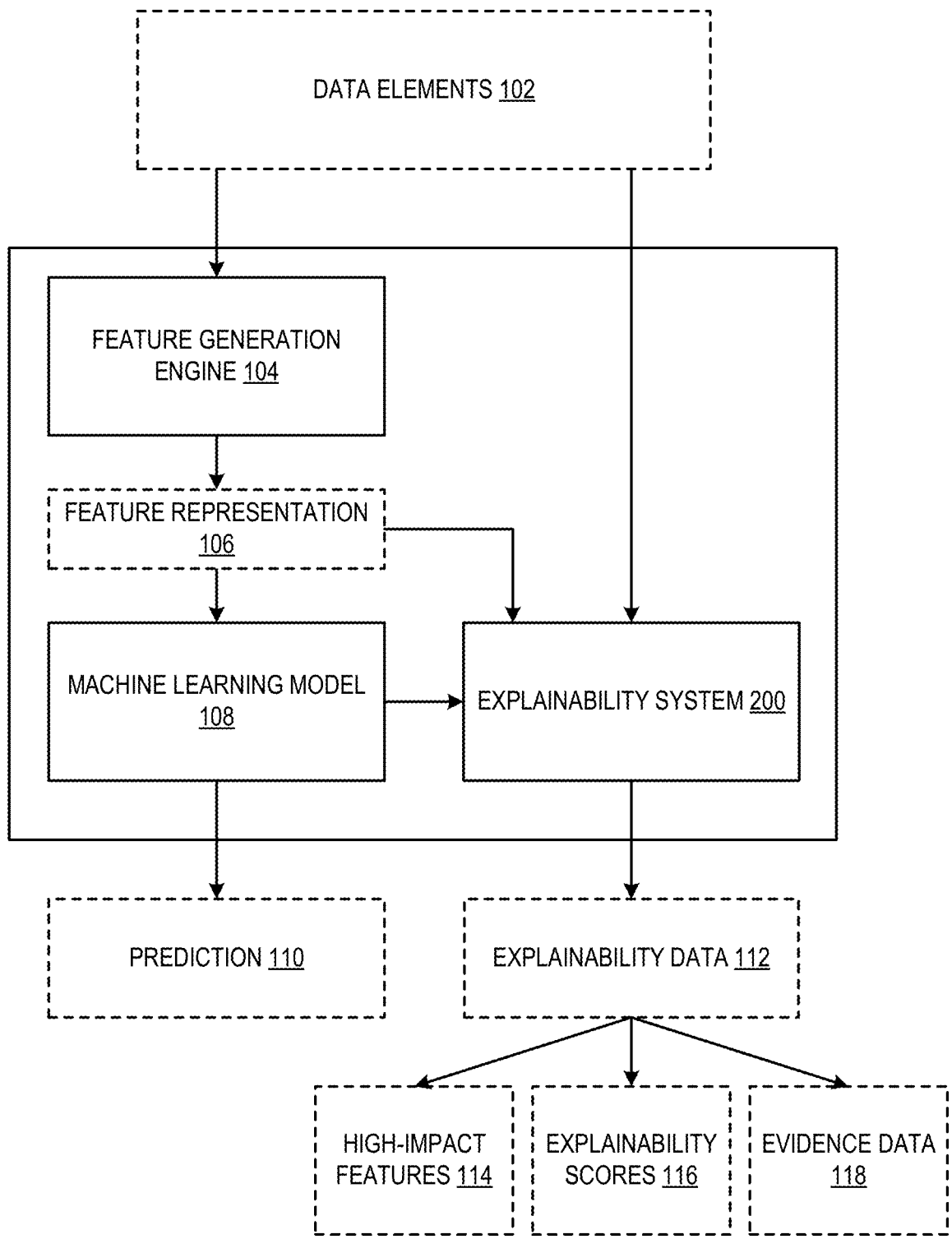
FIG. 1 shows an example prediction system.

FIG. 1 shows an example prediction system 100. The prediction system 100 is an example of a system implemented as computer programs on one or more computers in one or more locations in which the systems, components, and techniques described below are implemented.

The prediction system 100 is configured to process a collection of data elements 102 characterizing an entity to generate: (i) a prediction 110 for the entity, and (ii) explainability data 112 that explains the prediction 110. The explainability data 112 can explain the prediction 110, e.g., by providing an interpretable rationale that explains how the prediction system generated the prediction 110, as will be described in more detail below.

The data elements 102 can be represented as any appropriate sort of digital data, e.g., numerical data, alpha-numerical data, textual data, or a combination thereof. The data elements can be represented in any appropriate structured data format, e.g., as a collection of one or more tables.

The data elements 102 can characterize any appropriate type of entity. As a non-limiting example, the data elements 102 can represent a person, in particular, a patient in a healthcare environment. In this example, the data elements 102 can represent, e.g., electronic medical record (EMR) data, clinical laboratory data, insurance claim data, or a combination thereof.

EMR data for a patient can include, e.g., demographic data (e.g., characterizing the age, gender, employment, education, income, marital status, home address, etc., of the patient) and medical history data (e.g., characterizing immunization history of the patient, allergies of the patient, medications prescribed to the patient, medical diagnoses of the patient, consumption of alcohol by the patient, consumption of tobacco by the patient, height of the patient, weight of the patient, medical procedures performed on the patient, visits by the patient to emergency departments, visits by the patient to primary care physicians, visits by the patient to specialist physicians, etc.).

Clinical laboratory data for a patient can include data characterizing various physiological parameters of the patient across one or more time points that are determined by laboratory tests or procedures, e.g., blood panels (e.g., to measure the numbers of types of cells in the blood), lipid panels (e.g., to measure cholesterol and triglyceride levels), liver panels (e.g., to measure liver function), thyroid stimulation hormone (TSH) tests (e.g., to measure levels of TSH), urinalysis tests (e.g., characterizing the appearance, content, and concentration of urine), etc.

Insurance claim data for a patient characterizes billable interactions between the patient and healthcare providers, e.g., including billing codes that healthcare providers have submitted to insurers for payment for healthcare services rendered to the patient.

The data elements 102 can be imported and aggregated from a variety of different data sources, e.g., individual databases within or across one or more organizations. The data elements 102 can be subjected to one or more data cleaning operations, e.g., to standardize and normalize the data elements 102, prior to the data elements 102 being provided as an input to the prediction system 100.

The prediction system 100 can process the data elements 102 to generate any of a variety of predictions 110 for the entity characterized by the data elements. The prediction can be, e.g., a classification prediction, a regression prediction, or any other appropriate type of prediction. A classification prediction can include a respective score for each of one or more classes, where the score for a class defines a likelihood that the entity is included in the class. A regression prediction can include one or more numerical values from a continuous range of possible regression values (e.g., the interval [0,100]) that predict a quantity associated with the entity.

A few examples of possible predictions 110, when the data elements 102 characterize a patient in a healthcare environment, are described next. In one example, the prediction 110 can define a likelihood that the patient will experience an adverse medical event (e.g., an event requiring hospitalization) within a specified duration of time (e.g., one (1) month, six (6) months, one (1) year, or any other appropriate duration of time). In another example, the prediction 110 can define a likelihood that the patient will consistently self-administer a prescribed medication. In another example, the prediction 110 can define a likelihood that the patient will attend one or more scheduled medical appointments. In another example, the prediction 110 can define a prediction for a total value of medical services that will be provided to the patient of a specified duration of time. In another example, the prediction 110 can define a prediction for a value of a physiological parameter characterizing the patient (e.g., body mass, cholesterol, or red blood cell count) after a specified duration of time. In another example, the prediction 110 can define a prediction for a number of times that the patient will seek medical attention (e.g., in an emergency department or from a primary care physician) in a specified duration of time.

For convenience, this specification will primarily describe the data elements 102 as characterizing patients in healthcare environments. However, the techniques described herein are widely applicable and are not limited to the processing data elements 102 characterizing patients in healthcare environments. For example, the prediction system 100 can be configured to process data elements 102 characterizing a piece of manufacturing equipment (e.g., the usage history of the equipment, the manufacturer of the equipment, historical sensor data readings of the environment in the vicinity of the equipment, etc.) to generate a prediction classifying possible causes of a malfunction in the equipment.

The prediction system 100 includes a feature generation engine 104, a machine learning model 108, and an explainability system 200, which are each described in more detail next.

The feature generation engine 104 is configured to process the data elements 102 characterizing the entity to generate a feature representation 106 of the entity. The feature representation 106 of the entity can be represented as an ordered collection of features, e.g., a vector or matrix of features, where each feature can be represented, e.g., by one or more numerical values. The feature representation 106 can include, e.g., 100 features, 1000 features, 5000 features, or any other appropriate number of features. To generate a feature in the feature representation 106, the feature generation engine 104 can select a proper subset of the data elements 102 that are relevant to the feature, and then apply one or more transformation operations to the selected subset of the data elements 102.

To select a proper subset of the data elements 102 that are relevant to a feature in the feature representation 106, the feature generation engine 104 can apply a filtering operation associated with the feature to the collection of data elements 102. The filtering operation can define one or more selection criteria that, if satisfied by a data element, indicate that the data element is relevant to the feature. The selection criteria of a filtering operation can be based on, e.g., a value of a data element, a type of a data element, a time stamp associated with a data element, or a combination thereof.

The value of a data element can be, e.g., the numerical, alphanumerical, or textual value of the data element. A selection criterion of a filtering operation can define that a data element is relevant to a feature only if, e.g., the data element has a specified value, or the value of the data element is included in a specified set of values. For example, a selection criterion of a filtering operation can define that a data element is relevant to a feature only if the data element is a drug code (e.g., identifying a drug prescribed to a patient) from a specified set of drug codes.

The type of a data element can characterize, e.g., a type of event to which the data element pertains, e.g., emergency room visit, medical procedure, insurance claim, etc. A selection criterion of a filtering operation can define that a data element is relevant to a feature only if, e.g., the data element pertains to a specified type of event. For example, a selection criterion of a filtering operation can define that a data element is relevant to a feature only if the data element pertains to an emergency room visit.

The time stamp associated with a data element can represent, e.g., a time (e.g., a year, month, day, or hour) characterizing the data element. For example, the time stamp associated with a data element can characterize when an event associated with the data element occurred, e.g., if the data element pertains to an emergency room visit by a patient, then the time stamp can characterize when the emergency room visit occurred. A selection criterion of a filtering operation can define that a data element is relevant to a feature only if, e.g., the time stamp associated with the data element is within a specified time range. A specified time range can be defined, e.g., by a starting time point and an ending time point.

In some cases, the specified time range for a filtering operation can be determined based on a current time point. For example, for a feature that counts the number of emergency room visits by a patient in the last 12 months, the feature generation engine 104 can determine the starting time point of the filtering operation to be 12 months before the current time point. In this example, the feature generation engine can determine the ending time point of the filtering operation to be the current time point. In some cases, the specified time range for a filtering operation can be dynamically determined based on the collection of data elements 102. For example, for a feature that counts the number of emergency room visits within 30 days of a previous hospital discharge, the feature generation engine 104 can determine the starting time point of the filtering operation to be the date of a previous hospital discharge. The feature generation engine can dynamically determine the date of the previous hospital discharge from the collection of data elements. In this example, the feature generation engine can determine the ending time point of the filtering operation to be 30 days after the date of the previous hospital discharge.

Filtering the collection of data elements 102 to identify data elements 102 that are relevant to a feature in the feature representation can yield, e.g., zero (0) data elements (i.e., an empty result), one (1) data element, 10 data elements, 100 data elements, 1000 data elements, or any other appropriate number of data elements. The filtering operation can identify zero (0) data elements that are relevant to a feature, e.g., if none of the data elements 102 satisfy the selection criteria of the filtering operation. In response to determining that applying a filtering operation to the data elements 102 yields an empty result, the feature generation engine 104 can define the result of the filtering operation to be a "null" data element.

After filtering the data elements 102 to identify a proper subset of the data elements 102 as being relevant to a feature in the feature representation 106, the feature generation engine 104 can generate the feature by applying one or more transformation operations to the selected data elements. The feature generation engine 104 can apply any appropriate transformation operations to a subset of the data elements 102 to generate a corresponding feature in the feature representation 106. A few examples of transformation operations are described next.

In one example, the feature generation engine 104 can generate a feature by applying a "count" operation to a selected subset of the data elements 102 that are relevant to the feature. The count operation can output a numerical value, e.g., a non-negative integer value, defining the number of data elements in the subset of data elements 102 that are relevant to the feature. In a particular example, the feature generation engine 104 can select data elements 102 that are relevant to a feature by applying a filtering operation to select each data element 102 that indicates admission of a patient to an emergency room in the last 12 months. The feature generation engine 104 can then apply a count operation to the selected data elements 102 to generate a feature defining the number of times that the patient has been admitted to emergency rooms in the last 12 months.

In another example, the feature generation engine 104 can generate a feature by applying a model fitting operation to a subset of the data elements 102 that are relevant to the feature. More specifically, the feature generation engine 104 can fit the parameters of a specified model, e.g., a linear model, or a quadratic model, or any other appropriate model, to the subset of data elements 102 that are relevant to the feature. The values of one or more parameters of the fitted model can then define corresponding feature(s) in the feature representation 106. The parameters of a linear model can include, e.g., a slope parameter and an intercept parameter. The feature generation engine 104 can fit the parameters of the specified model using any appropriate parameter fitting technique, e.g., a least-squares parameter fitting technique. In a particular example, the feature generation engine 104 can select a subset of data elements 102 that are relevant to a feature by applying a filtering operation to select each data element 102 that defines a measurement of cholesterol levels in a patient over the last 12 months. The feature generation engine 104 can then apply a model fitting operation to the selected data elements 102 to generate a feature defining a slope of a linear model, e.g., that defines a trend in the cholesterol levels of the patient.

In some implementations, to generate a feature in the feature representation 106, the feature generation engine 104 can apply multiple filtering operations to the collection of data elements 102 to identify multiple respective subsets of the data elements 102. The feature generation engine 104 can then apply a respective transformation operation to each selected subset of the data elements 102 to generate an intermediate output, and then combine (e.g., sum) the intermediate outputs to generate the feature. For example, to generate a "frailty" feature, the feature generation engine 104 may apply a first filtering operation to select a subset of data elements 102 defining the medications prescribed to the patient, and a second filtering operation to select a subset of data elements 102 defining the previous medical diagnoses of the patient. The feature generation engine can then apply any appropriate transformation operation to each selected subset of features, and combine the results of the transformation operations.

The machine learning model 108 is configured to process the feature representation 106 of an entity, in accordance with a set of parameter values of the machine learning model 108, to generate a prediction 110 for the entity. Examples of possible predictions 110 that can be generated by the machine learning model are described above.

Generally, the machine learning model 108 can be any model having a set of trainable parameters that can be trained on a set of training examples to optimize an objective function. A training example can include: (i) a feature representation, and (ii) a target output that should be generated by the machine learning model by processing the feature representation. The objective function can measure, e.g., an error between predictions generated by the machine learning model and corresponding target outputs, e.g., a cross-entropy error, a squared-error, or any other appropriate error. The objective function can optionally include one or more "regularization" terms to stabilize and enhance the training of the machine learning model, e.g., a regularization term that measures an $L_1$ or $L_2$ norm of the parameter values of the machine learning model. Training the machine learning model on the training examples can encourage the machine learning model to generate predictions that match the target outputs specified by the training examples. To provide a few non-limiting examples, the machine learning model could include one or more of: a linear model, a gradient boosted decision tree model, a neural network model, random forest model, a support vector machine model, or any other appropriate model.

The explainability system 200 is configured to generate explainability data 112 that explains the prediction 110 generated by the machine learning model 108. The explainability data 112 can explain the prediction 110, e.g., by providing an interpretable rationale that explains how the prediction system 100 generated the prediction 110.

In particular, the explainability data 112 can include: (i) data identifying one or more "high-impact" features 114 in the feature representation 106, (ii) a respective "explainability score" 116 for each high-impact feature 114, and (iii) respective "evidence" data 118 for each high-impact feature 114. Each high-impact feature 114 can be a feature from the feature representation 106 that contributed significantly to the prediction 110. The explainability score 116 for a high-impact feature 114 is a numerical value that quantifies a contribution of the high-impact feature 114 to the prediction 110. The evidence data 118 for each high-impact feature is derived from a respective subset of data elements 102 that correspond to the high-impact feature 114, e.g., including the data elements 102 that were processed by the feature generation engine 104 to generate the high-impact feature 114. An example of an explainability system 200 that can generate explainability data 112 including high-impact features 114, explainability scores 116, and evidence data 118 will be described in more detail below with reference to FIG. 2.

In one example, for a prediction 110 that indicates a likelihood that a patient will experience an adverse medical event in the next six (6) months, the explainability data 112 could identify a "number of emergency room visits" feature and a "blood pressure trend" feature as being high-impact features 114. The "number of emergency room visits" feature could indicate, e.g., the number of times the patient has visited the emergency room in the last 12 months. The "blood pressure trend" feature could indicate, e.g., a slope of a linear model fitted to the systolic blood pressure measurements of the patient over the last 24 months. The explainability score 116 for the "number of emergency room visits" feature could be 80, and the normalized explainability score 116 for the "blood pressure trend" feature could be 20 (e.g., indicating that the "number of emergency room visits" feature made a greater contribution to the prediction 110 than the "blood pressure trend" feature). The evidence data 118 for the "number of emergency room visits" feature could include a listing of the respective date and reason for each emergency room visit by the patient in the last 12 months. The evidence data 118 for the "blood pressure trend" feature could include a listing of the respective date and value of each systolic blood pressure measurement of the patient over the last 24 months.

Generally, both the prediction 110 and the explainability data 112 that explain the prediction 110 can be different for different entities. Even for entities with the same or similar predictions 110, the explainability data 112 for these entities can be different. In particular, explainability data 112 for different entities can be different because the high-impact features 114 that contributed significantly to the respective prediction 110 for each entity can be different. For example, a high-impact feature explaining an elevated risk of mortality in one patient may be a number of emergency room visits in the last six (6) months feature, while for another patient it may be a frailty feature.

However, even for entities with one or more of the same high-impact features, the explainability data 112 for these entities can be different, in particular, because the evidence data 118 for the high-impact feature can be different for each entity. For example, two patients can both have "number of emergency room visits" as a high-impact feature 114, but the evidence data 118 for the "number of emergency room visits" feature can include different lists of the dates and reasons for the emergency room visits by each patient. In a particular example, for one patient, the evidence data may indicate that the patient has been admitted to the emergency room four (4) times in the last two (2) months for fainting episodes, while for the other patient, the evidence data may indicate that the patient was admitted to the emergency room four (4) times in the last six (6) months for minor heart attacks. Despite these two patients sharing the same high-impact feature having the same value, the evidence data can inform significantly different interpretations of the predictions generated for these patients. Thus, including the evidence data 118 in the explainability data 112 can significantly increase the granularity and interpretative value of the explainability data 112 as compared to, e.g., providing only the high-impact features 114 to explain the prediction 110.

After generating the explainability data 112, the prediction system 100 can provide the explainability data to a user of the prediction system 100, e.g., through a graphical user interface made available by the prediction system 100. For example, the prediction system 100 can provide a representation of the explainability data 112 to a user in the format of a table, where each column of the table corresponds to a respective high-impact feature 114 and presents the name of the high-impact feature 114 (e.g., "number of emergency room visits"), the explainability score 116 for the high-impact feature 114, and the evidence data 118 for the high-impact feature 114.

In some implementations, the prediction system 100 can refrain from generating explainability data 112 corresponding to certain predictions 110. For example, the prediction system 100 can determine that explainability data 112 should be generated to explain a prediction 110 only if the prediction 110 satisfies a "risk" criterion. In a particular example, the prediction 110 can define a likelihood that a patient will experience an adverse health event, and the prediction system 100 can determine that the prediction 110 satisfies the risk criterion only if the value of prediction 110 satisfies (e.g., exceeds) a threshold. The threshold can be, e.g., the $90^{th}$, $95^{th}$, or $99^{th}$ percentile, or any other appropriate percentile, of predictions 110 previously generated by the prediction system 100. As another example, the threshold can be a predefined threshold, e.g., such that the prediction system only generates explainability data for patients with a likelihood of at least 25% (or some other appropriate threshold) of experiencing an adverse health event. Thus, e.g., the prediction system 100 can generate explainability data 112 for only patients with predictions 110 which indicate that the patients are at a relatively high risk of an adverse health event.

Figure 2:
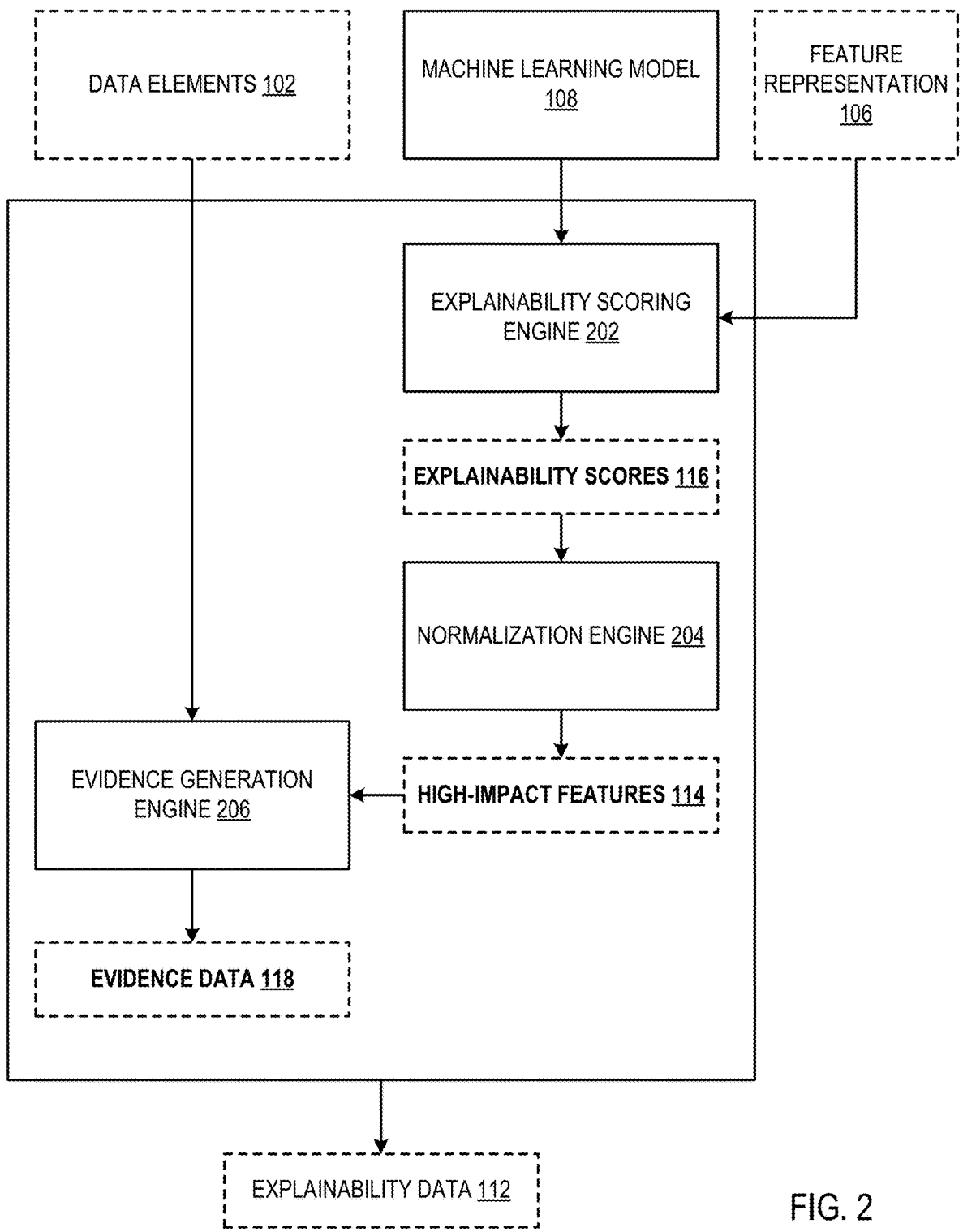
FIG. 2 shows an example explainability system.

FIG. 2 shows an example explainability system 200. The explainability system 200 is an example of a system implemented as computer programs on one or more computers in one or more locations in which the systems, components, and techniques described below are implemented.

The explainability system 200 is configured to generate explainability data 112 that explains the prediction generated by the machine learning model 108 by processing a feature representation 106 of an entity. The explainability data 112 can explain the prediction 110, e.g., by providing an interpretable rationale that explains how the prediction system generated the prediction 110. In particular, the explainability data 112 can include: (i) data identifying one or more high-impact features 114 in the feature representation 106, (ii) a respective explainability score 116 for each high-impact feature 114, and (iii) respective evidence data 118 for each high-impact feature 114.

The explainability system 200 can generate the explainability data 112 using an explainability scoring engine 202, a normalization engine 204, and an evidence generation engine 206, which will each be described in more detail next.

The explainability scoring engine 202 is configured to generate a respective explainability score 116 for each feature in the feature representation 106. Generally, the explainability score 116 for a feature is a numerical value that measures an impact of the feature on the prediction generated by the machine learning model by processing the feature representation 106. For example, a large positive explainability score for a feature can indicate that the feature contributed significantly to increasing the value of the prediction. Conversely, a large negative explainability score for a feature can indicate that the feature contributed significantly to decreasing the value of the prediction. An explainability score for a feature that is near zero can indicate that the feature did not contribute significantly to the prediction.

The explainability scoring engine 202 can generate the explainability scores 116 for a feature representation 106 using any appropriate technique. For example, the explainability scores 116 can be "SHAP" values, i.e., "Shapley additive explanations," or "local interpretable model-agnostic explanations," i.e., "LIME" values, that can essentially determine the explainability score for features by assessing how the prediction generated by the machine learning model changes as the features are permuted.

The normalization engine 204 is configured to process the explainability scores 116 to identify a proper subset of the features in the feature representation 106 as being high-impact features 114, and optionally, to normalize the explainability scores 116 for the high-impact features 114.

The normalization engine 204 can identify the high-impact features 114 based on the explainability scores 116 in any of a variety of possible ways. For example, the normalization engine 204 can identify a predefined number (e.g., 3, 5, 10, or any other appropriate number) of the features having the explainability scores with the largest magnitudes as being high-impact features 114. As another example, the normalization engine 204 can identify any feature having an explainability score with a magnitude that satisfies (e.g., exceeds) a predefined significance threshold as being a high-impact feature 114. Generally, the high-impact features 114 represent a proper subset of the features from the feature representation 106 that have the most impact on the prediction generated by the machine learning model 108 by processing the feature representation 106.

After identifying the high-impact features 114, the normalization engine 204 can normalize the respective explainability score 116 for each high-impact feature 114, e.g., by applying a scaling factor to the explainability score for the feature. The normalization engine 204 can apply a scaling factor to an explainability score, e.g., by setting the explainability score equal to a product of the explainability score and the scaling factor. Applying an appropriate scaling factor to the explainability scores can reduce or remove any dependence of the normalized explainability scores on the units or range of possible values of the prediction generated by the machine learning model. Normalizing the explainability scores can thus standardize their values and facilitate comparison of explainability scores across different machine learning models generating different predictions.

An example process for determining an appropriate significance threshold and an appropriate scaling factor for normalizing the explainability scores 116 is described in more detail with reference to FIG. 5.

The evidence generation engine 206 is configured to generate respective evidence data 118 for each high-impact feature 114. Generally, the evidence data 118 for a high-impact feature 114 is derived from a respective proper subset of the collection of data elements 102 that corresponds to the high-impact feature 114.

The evidence generation engine 206 can generate the evidence data 118 for a high-impact feature 114 by applying a filtering operation to the collection of data elements 102 to select the proper subset of the collection of data elements 102 that were used to generate the high-impact feature 114. (Generating each feature in the feature representation 106 using respective filtering and transformation operations is described in more detail with reference to FIG. 1).

For example, the set of high-impact features 114 could include a "number of emergency room visits" feature that indicates, e.g., the number of times that a patient has visited an emergency room in the last 12 months. The "number of emergency room visits" feature may have been generated by applying a filtering operation to select data elements 102 indicating a respective date of each emergency room visit by the patient in the last 12 months, and then applying a "count" operation to the selected data elements 102. In this example, the evidence data 118 for the "number of emergency room visits" feature can include data elements 102 indicating the date of each emergency room visit by the patient in the last 12 months.

Optionally, the evidence data 118 for a high-impact feature 114 can include additional data elements 102 related to the proper subset of the data elements 102 that were used to generate the high-impact feature 114. For example, for the "number of emergency room visits" feature described above, the evidence data 118 can further include data elements 102 indicating a respective reason for each emergency room visit by the patient. Thus, the evidence data 118 for the "number of emergency room visits" feature can include both the date of and the reason for each emergency room visit by the patent in the last 12 months. The evidence generation engine 206 can select the additional data elements 102 to be included in the evidence data 118 for a high-impact feature 114 (i.e., in addition to the proper subset of data elements that were used to generate the high-impact feature 114) using any appropriate filtering operation.

Optionally, after applying a filtering operation to select a proper subset of the data elements 102 relevant to a high-impact feature 114, the evidence generation engine 206 can generate the evidence data 118 by applying one or more "summarization" operations to the relevant subset of the data elements 102. The summarization operations that are applied to the relevant subset of the data elements 102 can be any appropriate counting, grouping, or clustering operations that serve, e.g., to generate a compact summary of the relevant subset of the data elements 102. For example, for a feature representing a total number of diagnoses of a patient, the relevant subset of the data elements 102 can include dozens of diagnoses for the patient, some of which can be repeated multiple times on different dates. The evidence generation engine 206 can apply counting and grouping operations to generate a compact summary of the diagnoses of the patient, e.g., that indicates, for each unique diagnosis of the patient, a number of times the diagnosis occurred and the date range from the time of the first diagnosis to the time of the last diagnosis.

Thus, the evidence generation engine 206 can generate evidence data for a high impact feature 114 that includes a representation of the relevant subset of the data elements 102 for the feature and/or a summary of the relevant subset of the data elements 102 for the feature. In some cases, the explainability system 200 can initially present evidence data 118 for a high-impact feature to a user that shows a summary of the relevant subset of the data elements 102 for the feature. In response to receiving an indication from the user, e.g., through a user interface, that further information should be provided, the explainability system 200 can present a full representation of the relevant subset of the data elements 102 for the feature.

In some implementations, the operations performed by the evidence generation engine 206 to generate evidence data 118 for a high-impact feature can be customizable by a user of the explainability system 200. That is, the explainability system 200 can enable a user to modify the filtering operation(s) and/or summarization operations used by the evidence generation engine 206 to generate the evidence data 118 for a high-impact feature 114.

Generally, the evidence data 118 can explain the rationale used by the machine learning model to generate a prediction for an entity at a significantly higher level of granularity than would be achieved, e.g., by only identifying the high-impact features 114. By improving the interpretability of the machine learning model 108, the explainability system 200 can increase user trust and confidence in predictions generated by the machine learning model 108.

In some cases, the prediction system 100 (described with reference to FIG. 1) can provide an interface for a user to specify respective filtering and transformation operations that should be used to generate each feature that is provided as an input to the machine learning model to generate predictions. For example, the prediction system 100 can enable the user to select the respective filtering and transformation operations to generate each feature from a predefined set of possible filtering and transformation operations. The explainability system 200 can then, without further user input and based on predefined rules, determine the filtering and summarization operations to generate the evidence data for each feature.

For example, a user can specify that a "number of emergency room visits" feature is generated using a filtering operation to identify the dates of each emergency room visit in the last 12 months and a counting operation to count the number of emergency room visits. In this example, the explainability system 200 can automatically determine the filtering and summarization operations used to generate the evidence data 118 for the "number of emergency room visits feature." For example, the explainability system 200 can determine that the evidence data 118 for the feature should be generated by a filtering operation to identify the date and reason for each emergency room visit in the last 12 months, and an aggregation operation to summarize the dates and reasons for the emergency room visits. The aggregation operation can, e.g., identify each unique reason for an emergency room visit, and then determine corresponding date range and number of occurrences for each unique emergency room visit.

The explainability system 200 can provide the high-impact features 114, the explainability scores 116, and the evidence data 118, as part of the explainability data 112, e.g., which is presented to a user of the explainability system 200.

In some implementations, as part of generating the explainability data 112 that explains a prediction generated by the machine learning model for an entity, the explainability system 200 outputs an explainability vector. The explainability vector can include: (i) the respective normalized explainability score for each high-impact feature 114, and (ii) an explainability score that is set to zero (or some other default value) for each other feature. The explainability system 200 can then provide the explainability vector for the entity to a clustering engine.

The clustering engine can receive respective explainability vectors from the explainability system 200 for each of multiple entities (e.g., for each of multiple patients), and then can apply a clustering operation to the set of explainability vectors. The clustering operation can be any appropriate operation that, when applied to the set of explainability vectors, generates a partition of the explainability vectors into one or more groups, e.g., such that explainability vectors in the same group tend to be more "similar" that explainability vectors in different groups. For example, the clustering operation can be a k-means clustering operation or an expectation-maximization (EM) clustering operation. A similarity between explainability vectors can be measured using any appropriate similarity measure, e.g., a Euclidean distance similarity measure or a cosine similarity measure. Clustering the explainability vectors into groups can reveal further insights into the entities being characterized by the prediction system. The results of the clustering can be presented to a user or provided for further downstream analysis.

Figure 3:
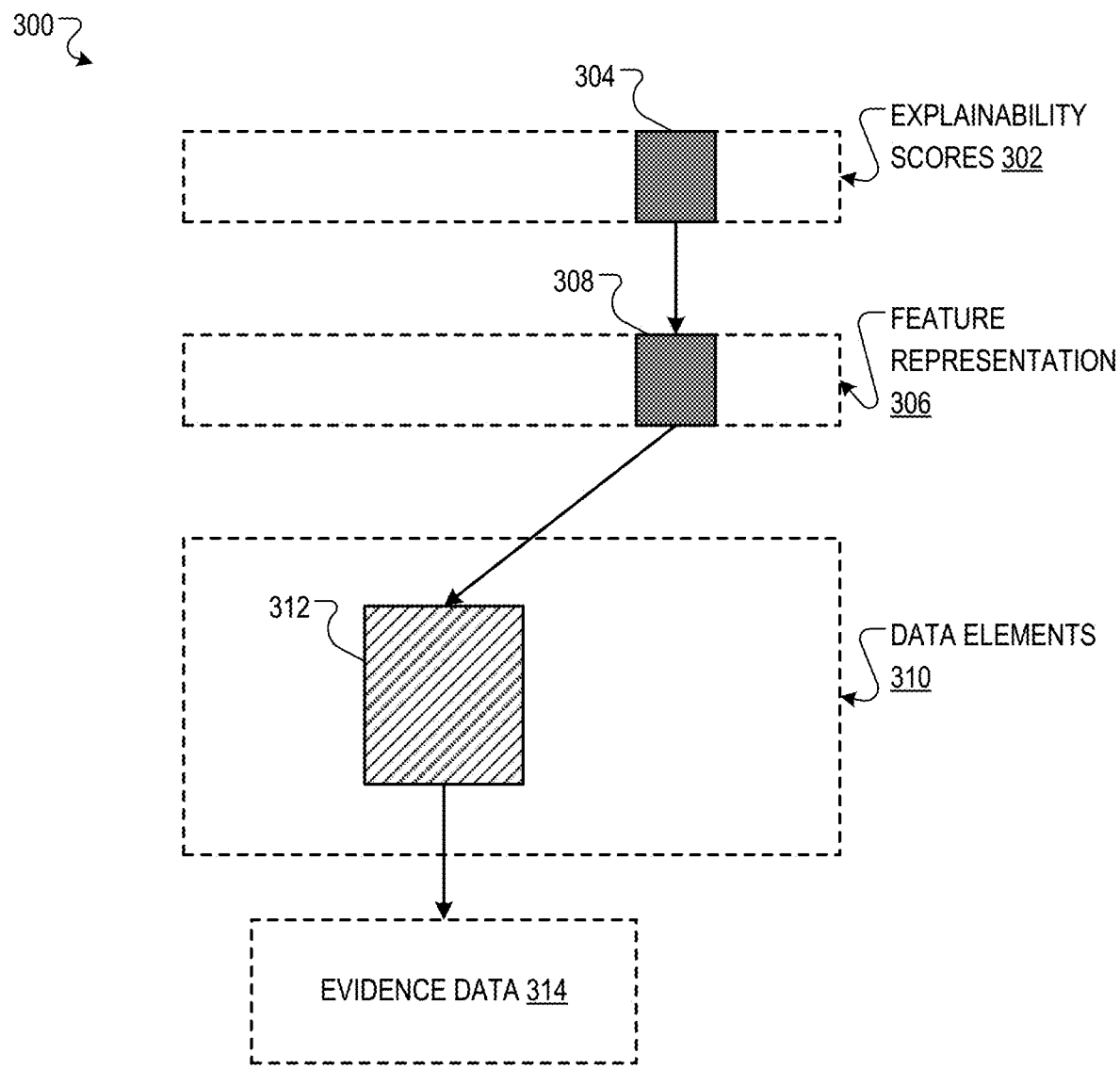
FIG. 3 illustrates an example data flow of the operations performed by an explainability system.

FIG. 3 illustrates an example data flow 300 of the operations performed by the explainability system 200 described with reference to FIG. 2 for identifying a high-impact feature and generating evidence data for the high-impact feature. The explainability system 200 can generate explainability scores 302 for the features of a feature representation 306, and can identify a feature 308 as high-impact feature based on the explainability score 304 of the feature 308. The explainability system 200 can then generate evidence data 314 for the feature 308 that summarizes a proper subset 312 of the collection of data elements 310 that was used to generate the feature 308.

Figure 4:
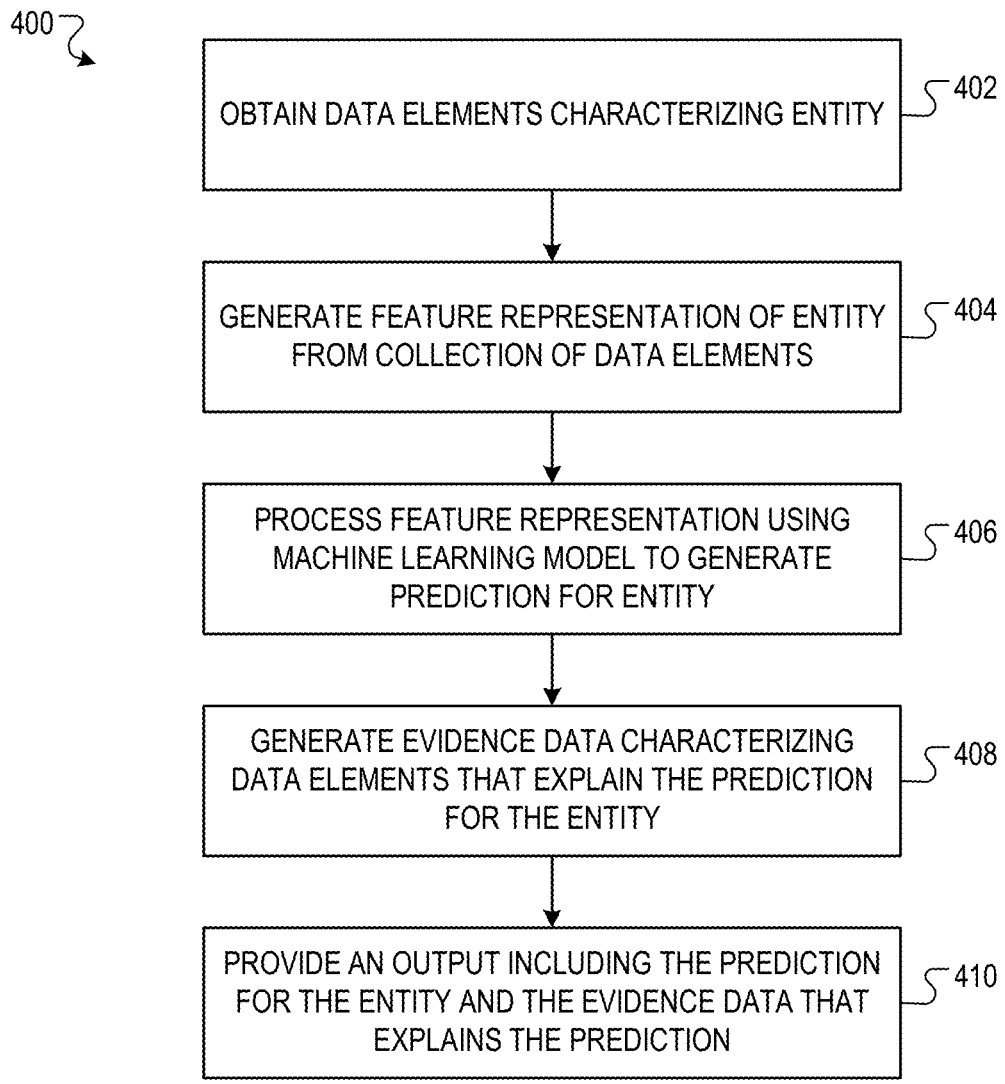
FIG. 4 is a flow diagram of an example process for processing a collection of data elements characterizing an entity to generate: (i) a prediction for the entity, and (ii) evidence data that explains the prediction for the entity.

FIG. 4 is a flow diagram of an example process 400 for processing a collection of data elements characterizing an entity to generate: (i) a prediction for the entity, and (ii) evidence data that explains the prediction for the entity. For convenience, the process 400 will be described as being performed by a system of one or more computers located in one or more locations. For example, a prediction system, e.g., the prediction system 100 of FIG. 1, appropriately programmed in accordance with this specification, can perform the process 400.

The system obtains a collection of data elements characterizing an entity (402). The data elements can be represented as any appropriate sort of digital data, e.g., numerical data, alpha-numerical data, textual data, or a combination thereof. The data elements can characterize any appropriate type of entity, e.g., a patient in a healthcare environment.

The system generates multiple features that collectively define a feature representation of the entity from the collection of data elements characterizing the entity (404). To generate each feature, the system can select a respective proper subset of the collection of data elements that are relevant to the feature. The system can then generate the feature by applying one or more transformation operations to the proper subset of the collection of data elements that are relevant the feature.

The system processes the feature representation of the entity using a machine learning model to generate a prediction for the entity (406). The machine learning model can include, e.g., a linear model, a gradient boosted decision tree model, a neural network model, or a combination thereof. The prediction can be, e.g., a classification prediction, a regression prediction, or any other appropriate type of prediction.

The system generates evidence data characterizing data elements from the collection of data elements that explain the prediction generated by the machine learning model for the entity (408). To generate the evidence data, the system can generate a respective explainability score for each feature in the feature representation that measures an impact of the feature on the prediction generated by the machine learning model for the entity. The system can then identify one or more of the features having the highest explainability scores as being high-impact features. The system can identify, for each high-impact feature, a respective proper subset of the collection of data elements that are relevant to the high-impact feature, e.g., including the data elements that the system processed to generate the feature. The system can then generate respective evidence data for each high-impact feature, e.g., that summarizes the proper subset of the collection of data elements that are relevant to the high-impact feature.

The system provides an output including the prediction generated for the entity by the machine learning model and the evidence data that explains the prediction (410). The output can further include data identifying the high-impact features and the respective explainability score for each high-impact feature. The system can provide a representation of the output, e.g., to a user of the system by way of a user interface.

Figure 5:
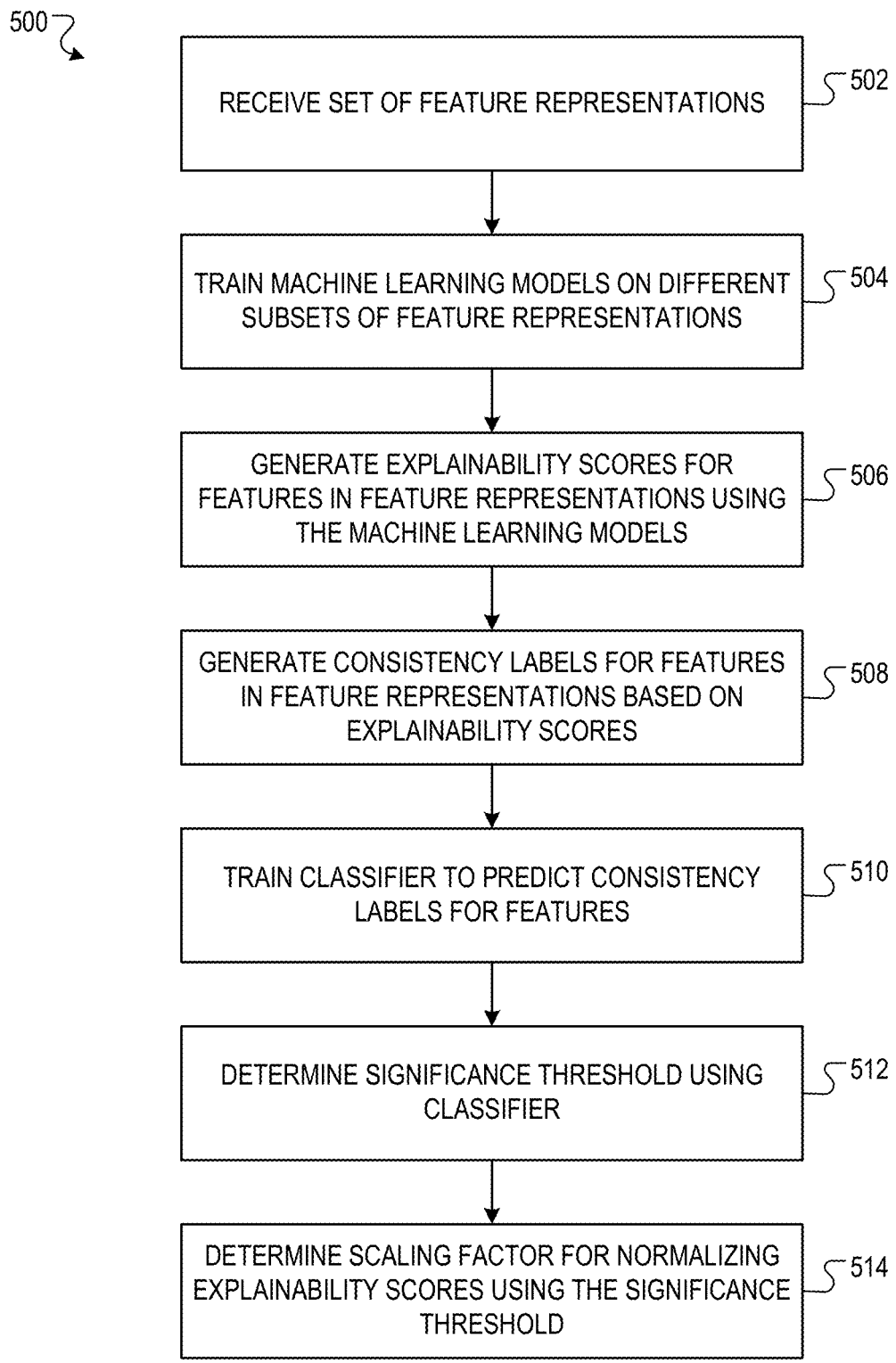
FIG. 5 is a flow diagram of an example process for determining: (i) a significance threshold for explainability scores, and (ii) a scaling factor for normalizing explainability scores.

FIG. 5 is a flow diagram of an example process 500 for determining: (i) a significance threshold for explainability scores, and (ii) a scaling factor for normalizing explainability scores. The significance threshold for explainability scores defines a threshold for determining whether a feature qualifies as a high-impact feature, e.g., such that any feature having an explainability score above the significance threshold can be designated as a high-impact feature, as described with reference to FIG. 2. The scaling factor can be applied to explainability scores to normalize them, e.g., to reduce or remove any dependence of the explainability score on the units or range of possible values of the predictions generated by the machine learning model, as described with reference to FIG. 2. For convenience, the process 500 will be described as being performed by a system of one or more computers located in one or more locations. For example, an explainability system, e.g., the explainability system 200 of FIG. 2, appropriately programmed in accordance with this specification, can perform the process 500.

The system receives a set of feature representations, where each feature representation represents a respective entity (502). Each entity can be, e.g., a patient, and the feature representation of each entity can be generated from a collection of data elements characterizing the entity, as described with reference to FIG. 1.

The system trains each machine learning model in a set of multiple machine learning models on a different subset of the set of feature representations (504). The system trains each machine learning model to perform the same prediction task, in particular, processing a feature representation of an entity to generate a prediction characterizing the entity. Generally, each of the machine learning models has different parameter values, i.e., as result of being trained on a different set of training data. The machine learning models can be, e.g., linear models, gradient boosted decision tree models, or any other appropriate models.

The system generates a set of multiple explainability scores for each feature in each feature representation using the set of machine learning models (506). In particular, for each feature in each feature representation, the system generates a respective explainability score for the feature with respect to each of the machine learning models that were not trained on the feature representation.

The system generates a "consistency label" for each feature in each feature representation based on the set of explainability scores for the feature (508). For example, the system can generate a consistency label of "1" (or some other predefined value) for a feature if each explainability score for the feature has the same sign, i.e., if all the explainability scores for the feature are either positive or negative. Otherwise, the system can generate a consistency label of "0" (or some other predefined value) for the feature.

The system trains a classifier that is configured to process an absolute value of an explainability score for a feature to predict the consistency label of the feature (510). The classifier can be, e.g., a logistic regression classifier of the form:

$$p = \frac{\exp(b + m \cdot x)}{1 + \exp(b + m \cdot x)} \quad (1)$$

where p∈[0,1] is the predicted likelihood that the consistency label for a feature is "1", x is an absolute value of an explainability score for the feature, and b and m are learned parameter values. The system trains the classifier on the sets of explainability scores and corresponding consistency labels for the features in the set of feature representations.

The system determines the significance threshold for explainability scores using the classifier (512). For example, the system can determine the significance threshold to be the value that, when provided as an input to a logistic regression classifier as the absolute value of an explainability score for a feature, results in the logistic regression classifier generating a specified predicted likelihood, e.g., p=0.5, of the consistency label for the feature being "1", i.e., indicating that each explainability score for the feature has the same sign.

The system determines the scaling factor for normalizing explainability scores using the significance threshold (514). For example, to determine the scaling factor, the system can select a respective explainability score for each feature in each feature representation, e.g., by sampling an explainability score from the set of explainability scores for the feature. The system can identify the features having an explainability score that does not satisfy (e.g., exceed) the significance threshold, and set the explainability scores for these features to zero (0). The system then determines a scaling factor that, when applied to the explainability score of each feature in each feature representation, causes the average of the sum of the magnitudes of the explainability scores for each feature representation to be 100 (or some other specified value).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining a collection of data elements characterizing an entity;
   generating a plurality of features that collectively define a feature representation of the entity from the collection of data elements characterizing the entity, wherein generating each feature comprises:
     selecting a proper subset of collection of data elements that corresponds to the feature; and
     generating the feature by applying one or more transformation operations to the proper subset of the collection of data elements that corresponds to the feature;
   processing the feature representation of the entity using a machine learning model to generate a prediction for the entity;

generating explainability data that explains the prediction generated by the machine learning model for the entity, comprising:
identifying a proper subset of the features in the feature representation of the entity as being high-impact features based on their impact on the prediction generated by the machine learning model for the entity; and
generating respective evidence data that explains each high-impact feature, comprising, for one or more of the high-impact features:
applying one or more selection criteria to the collection of data elements to identify a plurality of data elements from the collection of data elements that were processed, by one or more transformation operations, to generate the high-impact feature; and
generating the evidence data that explains the high-impact feature by applying one or more summarization operations to generate a summary of the plurality of data elements that were processed, by the one or more transformation operations, to generate the high-impact feature;
wherein the explainability data comprises the respective evidence data that explains each high-impact feature; and
providing an output comprising the prediction for the entity and the explainability data that explains the prediction for the entity.

2. The method of claim 1, wherein identifying a proper subset of the features in the feature representation of the entity as being high-impact features comprises:
generating a respective explainability score for each feature in the feature representation of the entity that measures an impact of the feature on the prediction generated by the machine learning model for the entity; and
identifying one or more of the features having the highest explainability scores as being high-impact features.

3. The method of claim 2, wherein identifying one or more of the features having the highest explainability scores as being high-impact features comprises:
identifying each feature having an explainability score that satisfies a predefined significance threshold as being a high-impact feature.

4. The method of claim 3, wherein the significance threshold for the explainability scores of the high-impact features is determined by a plurality of operations comprising:
training a classifier that is configured to process an absolute value of an explainability score for an input feature to predict a likelihood that each explainability score in a set of explainability scores associated with the input feature have a same sign; and
determining the significance threshold using the classifier.

5. The method of claim 4, wherein each explainability score in the set of explainability scores associated with the input feature is determined with reference to a different machine learning model having different parameter values as a result of being trained on a different set of training data.

6. The method of claim 4, wherein for each explainability score in the set of explainability scores associated with the input feature, a sign of the explainability score designates whether the explainability score is positive or negative.

7. The method of claim 4, wherein determining the significance threshold using the classifier comprises:
determining the significance threshold to be a value that, when provided as an input to the classifier as an absolute value of an explainability score for a given feature, results in the classifier generating an output that defines a specified likelihood that each explainability score in a set of explainability scores associated with the given feature have a same sign.

8. The method of claim 4, wherein the classifier generates the likelihood p that each explainability score in the set of explainability scores associated with the input feature have the same sign in accordance with the equation:

$$p = \frac{\exp(b + m \cdot x)}{1 + \exp(b + m \cdot x)}$$

wherein x is the absolute value of the explainability score for the input feature, and b and m are learned parameter values of the classifier.

9. The method of claim 2, further comprising:
normalizing the explainability scores for the features in the feature representation of the entity; and
providing the normalized explainability scores for processing by a clustering operation.

10. The method of claim 1, further comprising, prior to generating the respective evidence data for each high-impact feature:
determining the selection criteria and the summarization operations to be used to generate the evidence data for the high-impact feature based on filtering operations and transformation operations applied to the collection of data elements to generate the high-impact feature.

11. The method of claim 1, wherein for each feature in the feature representation of the entity, selecting the proper subset of the collection of data elements that corresponds to the feature comprises:
applying a filtering operation associated with the feature to the collection of data elements, wherein the filtering operation defines one or more selection criteria that, if satisfied by a data element, indicate that the data element is included in the proper subset of the collection of data elements that corresponds to the feature.

12. The method of claim 1, wherein for each high-impact feature, the selection criteria applied to the collection of data elements to identify the plurality of data elements as relevant to the high-impact feature are based on one or more of: values of data elements, types of data elements, and time stamps associated with data elements.

13. The method of claim 1, wherein for each feature in the feature representation of the entity, generating the feature by applying one or more transformation operations to the proper subset of the collection of data elements that corresponds to the feature comprises:
applying a counting operation to the proper subset of the collection of data elements corresponding to the feature that outputs a value representing a number of data elements in the proper subset of the collection of data elements corresponding to the feature; and
determining a value of the feature based on the output of the counting operation.

14. The method of claim 1, wherein for each feature in the feature representation of the entity, generating the feature by applying one or more transformation operations to the proper subset of the collection of data elements that corresponds to the feature comprises:

applying a model fitting operation to the proper subset of the collection of data elements corresponding to the feature by determining values of one or more parameters of a specified model to fit the model to the proper subset of the collection of data elements corresponding to the feature; and determining a value of the feature based on the values of one or more parameters of the specified model.

15. The method of claim 1, wherein providing the output comprises presenting a representation of the prediction for the entity and the explainability data that explains the prediction for the entity to a user for use in interpreting a rationale used by the machine learning model to generate the prediction for the entity.

16. The method of claim 1, further comprising:
determining that the prediction for the entity exceeds a threshold; and
generating the evidence data for the prediction in response to determining that the prediction for the entity exceeds the threshold.

17. The method of claim 1, wherein generating the evidence data explains the high-impact feature by applying one or more summarization operations to generate a summary of the plurality of data elements that were processed, by the one or more transformation operations, to generate the high-impact feature comprises:
identifying that multiple data elements sharing a same characteristic are included in the plurality of data elements that were processed, by the one or more transformation operations, to generate the high-impact feature; and
replacing the multiple data elements sharing the same characteristic by summarized data that identifies: (i) the characteristic, and (ii) a number of data elements sharing the characteristic that are include in the plurality of data elements that were processed, by the one or more transformation operations, to generate the high-impact feature.

18. The method of claim 17, wherein the multiple data elements sharing the same characteristic are each data elements indicating a same medical diagnosis of a patient.

19. A system comprising:
one or more computers; and
one or more storage devices communicatively coupled to the one or more computers, wherein the one or more storage devices store instructions that, when executed by the one or more computers, cause the one or more computers to perform operations comprising:
obtaining a collection of data elements characterizing an entity;
generating a plurality of features that collectively define a feature representation of the entity from the collection of data elements characterizing the entity, wherein generating each feature comprises:
selecting a proper subset of collection of data elements that corresponds to the feature; and
generating the feature by applying one or more transformation operations to the proper subset of the collection of data elements that corresponds to the feature;
processing the feature representation of the entity using a machine learning model to generate a prediction for the entity;
generating explainability data that explains the prediction generated by the machine learning model for the entity, comprising:
identifying a proper subset of the features in the feature representation of the entity as being high-impact features based on their impact on the prediction generated by the machine learning model for the entity; and
generating respective evidence data that explains each high-impact feature, comprising, for one or more of the high-impact features:
applying one or more selection criteria to the collection of data elements to identify a plurality of data elements from the collection of data elements that were processed, by one or more transformation operations, to generate the high-impact feature; and
generating the evidence data that explains the high-impact feature by applying one or more summarization operations to generate a summary of the plurality of data elements that were processed, by the one or more transformation operations, to generate the high-impact feature;
wherein the explainability data comprises the respective evidence data that explains each high-impact feature; and
providing an output comprising the prediction for the entity and the explainability data that explains the prediction for the entity.

20. One or more non-transitory computer storage media storing instructions that when executed by one or more computers cause the one or more computers to perform operations comprising:
obtaining a collection of data elements characterizing an entity;
generating a plurality of features that collectively define a feature representation of the entity from the collection of data elements characterizing the entity, wherein generating each feature comprises:
selecting a proper subset of collection of data elements that corresponds to the feature; and
generating the feature by applying one or more transformation operations to the proper subset of the collection of data elements that corresponds to the feature;
processing the feature representation of the entity using a machine learning model to generate a prediction for the entity;
generating explainability data that explains the prediction generated by the machine learning model for the entity, comprising:
identifying a proper subset of the features in the feature representation of the entity as being high-impact features based on their impact on the prediction generated by the machine learning model for the entity; and
generating respective evidence data that explains each high-impact feature, comprising, for one or more of the high-impact features:
applying one or more selection criteria to the collection of data elements to identify a plurality of data elements from the collection of data elements that were processed, by one or more transformation operations, to generate the high-impact feature; and
generating the evidence data that explains the high-impact feature by applying one or more summarization operations to generate a summary of the plurality of data elements that were processed, by the one or more transformation operations, to generate the high-impact feature;
wherein the explainability data comprises the respective evidence data that explains each high-impact feature; and
providing an output comprising the prediction for the entity and the explainability data that explains the prediction for the entity.

* * * * *